Figure 1:
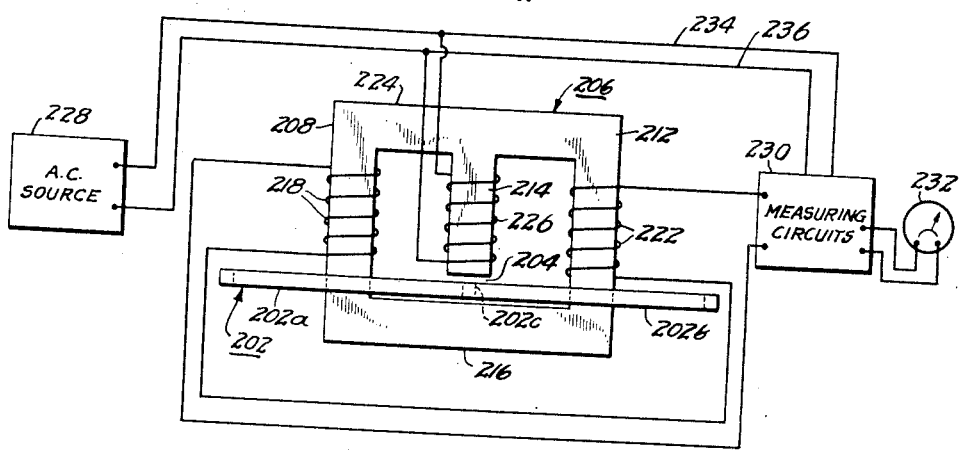

Dec. 14, 1954     G. SMITH     2,697,214
MEASURING DEVICE
Original Filed Dec. 6, 1949

INVENTOR
GRAYDON SMITH
BY
Curtis Morris & Safford
ATTORNEYS

United States Patent Office 2,697,214
Patented Dec. 14, 1954

2,697,214

MEASURING DEVICE

Graydon Smith, Concord, Mass., assignor to Graydon Smith Products Corporation, Boston, Mass.

Original application December 6, 1949, Serial No. 131,410. Divided and this application July 19, 1952, Serial No. 299,898

5 Claims. (Cl. 340—195)

This invention is in the field of electrical measuring systems and relates particularly to devices for producing an electrical signal whose value is a measure of the displacement of a movable element from a predetermined position. This is a division of my application Serial No. 131,410, filed December 6, 1949, now U. S. Patent No. 2,631,272, issued March 10, 1953.

In many instances, the value of an unknown condition can be measured by arranging for the condition to control the physical displacement of a movable element and measuring the extent of the displacement. For example, it is often convenient to measure pressure, strain, roughness, etc., by measuring the amount of movement or the position of such a controlled element. In gauging, a feeler is commonly used and its displacement from a predetermined position is a direct measure of the deviation of the test piece from a predetermined dimension.

Because electrical signals can be magnified electronically, it is advantageous in many instances to translate the position or displacement of the movable element into an electrical signal which, after amplification, can be used to operate an indicator, recorder, control system, or the like.

A large variety of such devices for translating physical displacements into electrical signals have been heretofore proposed. However, certain undesirable characteristics inherent in the prior devices have limited their use. For example, some position responsive devices are not sufficiently sensitive to permit precise measurements, some have unstable or non-linear response characteristics which may be of such nature that correction or compensation is difficult or impossible, and many such devices deliver only feeble electrical quantities so that compensation circuits which waste part of the measuring signal in order to compensate for the characteristic of the measuring device or other parts of the system cannot be employed. These and other defects or shortcomings of such sensing devices must be considered carefully in selecting the type of device to be used for a particular application. Thus, for certain operations, the sensing device must be one that permits a large amount of overtravel of the positioned element without damaging the measuring system, whereas for other uses, it is more important that the positioned element be freely movable so as to place minimum load on the driving system.

It is an object of the present invention to provide a position responsive device which combines a large number of advantageous features and which overcomes in a large measure the disadvantages of earlier devices whereby it is well suited for use in many widely different applications. In a preferred embodiment of the invention, a movable non-magnetic element controls the relative distribution of alternating magnetic flux between two alternate magnetic circuit paths.

The flux in the two paths is caused to generate corresponding voltages by which the relative distribution of flux can be measured. Such an arrangement provides high sensitivity, a relatively high output signal, and minimum reaction forces on the positioned element. In one aspect, the invention is directed to improving the sensitivity of position responsive devices and increasing the magnitude of the output signal with a given displacement. Another aspect of the invention relates to such a position responsive device capable of measuring displacement parallel to a given path even though the non-magnetic element is not guided mechanically to move along this path. Still another aspect of the invention is directed to a position sensitive device in which there is substantially no reactive force developed on the movable element by the associated magnetic circuits.

Figure 2:
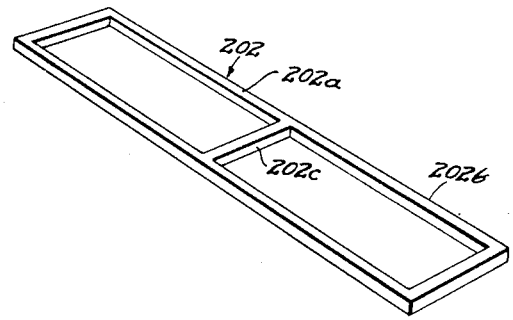

These and other objects, aspects, and advantages of the invention will be in part pointed out in and in part apparent from the following description considered in conjunction with the accompanying drawings, in which:

Figure 1 shows an embodiment of the invention in which the movable element is in the form of a double ring; and Figure 2 is a perspective view of the movable element of the device shown in Figure 1.

As shown in Figure 1, a position responsive device is arranged to measure the lateral displacement of a movable element 202.

The physical displacement of the element 202 from a neutral or zero position is measured by means of two rings or "flux-barriers" indicated in Figure 2 at 202a and 202b. By the term "flux-barrier" is meant a non-magnetic, electrically conducting member which resists any change in the magnetic flux linking it or passing through it. In this example, each of the flux-barriers 202a and 202b comprises a shorted turn of conductive non-magnetic material such as copper, brass, or the like, and encloses, and is spaced from, one of the side legs 208 and 212 of a magnetic core, generally indicated at 206, formed, for example, of laminations of a good grade of transformer iron. Lateral movement of the flux-barrier element 202 is utilized to control the relative division of flux between two outer legs 208 and 212 of the core 206.

In order to accomplish this flux control, the flux-barrier element 202 extends through an air gap 204, which, in this example, is of uniform cross-sectional area, formed by the space between the upper surface of a bottom core leg 216 and the free end of an inner core leg 214. This core leg 214 is connected to an upper leg 224 to form a T-shaped portion of the core 206, the outer ends of the cross-bar of the T being joined, respectively, to the outer core legs 208 and 212. Alternating flux is induced in the core 206 by the flow of alternating current through an energizing winding 226 which surrounds the inner core leg 214.

The flux-barrier 202 may be considered as formed of two separate ring portions 202a and 202b, which have a common side 202c, positioned within the air gap 204. The ring portion 202a surrounds a portion of the flux across the air gap 204 and, in addition, surrounds the outer leg 208 of the core 206. The ring portion 202b surrounds the remainder of the flux across the gap 204 and also surrounds the outer leg 212 of the core 206. Alternating flux is induced in the center leg 214 of core 206, and, with the flux-barrier 202 positioned symmetrically with respect to the magnetic structure, that is, so that the center conductor 202c of the flux-barrier bisects the air gap 204, an equal amount of flux will be induced in the two legs 208 and 212.

The flux-barrier 202 maintains this equalization of flux in the following manner: Flux lines which extend from the center leg 214 downwardly through the ring portion 202a also extend upwardly through this same ring portion 202a, so that these flux lines do not link with the ring portion 202a which, therefore, offers no opposition to this alternating flux. That is, the ring portion 202a offers no opposition to the flow of flux which at any instant extends twice through the ring portion 202a in opposite directions. However, the ring portion 202a will oppose any alternating flux with which it links. Thus, magnetic flux which extends from core leg 214 through ring portion 202b into core portion 216 is prevented from extending through core leg 208, and therefore extends through core leg 212. Thus, when the flux-barrier 202 is displaced toward the right, as viewed in Figure 4, the flux in core leg 208 is increased and the flux in core leg 212 is decreased by a corresponding amount.

Because the distribution of flux across the air gap 204 is substantially linear, over the useful range of movement of the flux-barrier 202, the relative division of flux between the two legs 208 and 212 of the core 206 is directly proportional to the displacement of the flux-barrier 202 from its zero position. It is apparent, however, that for particular applications, where a non-linear response characteristic is desired, the gap may be constructed so that it is non-uniform in a manner to give the desired response characteristic.

In order to measure the relative amounts of flux in the two legs 208 and 212, two identical windings 218 and 222 are positioned, respectively, around the legs 208 and 212. A source 228 of alternating current is connected by leads 46 and 48 to the energizing winding 226 which surrounds the inner core leg 214. The source 228 delivers an alternating current signal which, for example, may be at the frequency of the alternating current supply mains, and which preferably is stabilized in magnitude to minimize disturbances such as might be caused by changes in the supply voltage. The flow of current through the winding 36 produces alternating magnetic flux which is divided between the outer core legs 208 and 212 in accordance with the displacement of the flux-barrier element 202. The windings 218 and 222 are connected, in series opposition, to the input terminals of suitable measuring circuits including an amplifier-detector, indicated in block form at 230.

With the flux-barrier element 202 in its zero position, equal voltages are produced in the windings 208 and 212 and effectively cancel each other. When the flux-barrier element 202 is displaced either to the right or left of its zero position, these voltages are no longer equal and the difference voltage is impressed on the measuring circuits 230. This unbalance signal is amplified and detected, and the output signal from the measuring circuits is connected to an indicator 232, which may be a meter, recorder, or control system.

Phase sensing may be utilized in the measuring circuits as a means for determining the direction of displacement of the flux-barrier element 202 from its zero position, that is, to determine whether the magnitude of the flux in leg 208 is more or less than the magnitude of the flux in leg 212. Accordingly, the signal source 228 is connected also by leads 234 and 236 to the measuring circuits 230, so that the phase of the signal applied to input terminals of the measuring circuits can be compared with the phase of the signal from source 228.

For applications where it is not necessary to determine the direction of displacement of the flux-barrier element 202, the phase detection portion of the system can be eliminated and the amplified signal used to operate an indicator, recorder, or other device. Measuring systems of the general type indicated in block form at 230 are well known so that a detailed description is not necessary here.

A relatively high voltage output signal is produced so that compensating networks can be employed readily to correct automatically for temperature deviation and other factors affecting the system. In most applications, it will be found that no compensation networks are required to correct for errors in the position responsive device, which can be constructed to have an inherently linear characteristic and substantially unaffected by ordinary changes in environmental conditions. The null point is sharp and no appreciable third harmonic component is present in the output signal so that a good null is obtained.

The flux-barrier is of non-magnetic material so that there is no magnetic attraction between it and other parts of the measuring device to impede its free movement, and it has been found that there is very little reactive force on the flux-barrier caused by the circulating currents induced therein. This effect is negligible if a high impedance circuit is connected across the windings 218 and 222. Thus, when these windings are coupled to the grid-cathode input circuit of an amplifier, such a high impedance arrangement is readily available.

The embodiment of the invention described above is well adapted for measuring displacement wherein expansion or contraction of the mechanical parts of the system is likely to cause appreciable errors in the measurements. For example, because the position responsive device measures the relative positions of the center core leg 214 and the flux-barrier 202, the fixed member of the mechanical measuring system can be anchored directly to the core leg 214, while the movable member is connected to the flux-barrier 202. For example, in a gauge for measuring thickness, (not illustrated) the base of the gauge can be anchored to the center core leg 214 (or even to the outer core portions, such as 208 or 212) by suitable non-magnetic material, and the movable feeler gauge can be coupled by similar material to the flux-barrier, so that the connecting members, being of substantially the same length and material, will expand and contract by the same amounts and thereby eliminate to a large extent errors produced by temperature changes. Considerable over-travel of the flux-barrier is possible without injury to the measuring device, the movement of the flux-barrier 202 being limited only when the common side 202c strikes one or the other of the magnetic core legs 208 and 212.

I claim:

1. A position-responsive device including first and second circuits of magnetic material having a common circuit portion arranged to form at least one airgap adjacent a dividing point of said circuits, a non-magnetic electrically conductive flux-barrier having first and second loop portions, each of said loop portions extending through said airgaps and around respective ones of said magnetic circuits at a substantial distance from said airgap, inductive means for inducing alternating flux into said magnetic circuits, and measuring means for determining the relative division of flux between said first and second circuits.

2. A position responsive device including a ferromagnetic structure arranged to form first and second magnetic circuits having a common portion and a series air gap, a first winding for inducing alternating flux in said common portion, a movably-mounted flux-barrier comprising two individual closed loops of non-magnetic electrically-conductive material having a common portion positioned to extend into and across said air gap, said common portion being narrow with respect to the width of said airgap, said closed loops closing respectively around said first and second magnetic circuits at a position removed from said airgap, each of said closed loops surrounding all of the flux in its respective associated magnetic circuit, thereby to vary the relative division of flux between said first and second magnetic circuits as a measure of the displacement of said flux-barrier from a predetermined position, second and third windings connected in series opposition and coupled, respectively, to said first and second magnetic circuits, and measuring means connected to said second and third windings for indicating the displacement of said flux-barrier from said predetermined position.

3. In a displacement responsive device, the combination including a closed magnetic circuit having first, second, and third portions, a shunt ferromagnetic structure extending across said closed circuit and arranged to form an air gap between said shunt structure and said first portion, a flux-barrier comprising two electrically continuous loops of non-magnetic material arranged adjacent each other with a common transverse element, said loops respectively surrounding said second and third portions of said closed magnetic circuit located at a substantial distance form said air gap, said transverse element being positioned normally to pass through said air gap, said transverse element being significantly narrower than said air gap and means for inducing alternating flux in said shunt circuit, whereby the division of flux between spaced portions of said closed magnetic circuit is a measure of the displacement of said flux barrier along said first portion from a predetermined position.

4. In apparatus for measuring physical displacement, the combination including a structure of magnetic material having first and second circuit portions and including a circuit portion common to said first and second circuits, said magnetic structure being arranged to form an air gap between said common circuit portion and a junction point of said first and second circuit portions, a flux-barrier including two adjacent closed loops of non-magnetic material secured together and movably positioned and having a common cross-bar extending through said air gap, each of said closed loops completely encircling one of said magnetic circuits at a significant distance from said air gap, an energizing winding coupled to said magnetic structure, a source of alternating current coupled to said energizing winding to induce magnetic flux in said structure, and first and second pick-up windings coupled, respectively, to said first and second circuit portion, whereby each of said closed loops encircles all of the flux in its respective associated magnetic circuit the division of flux between said first and second circuit portions is a function of the displacement of said cross bar of said flux-barrier along said air gap from a predetermined position so that the relative voltages induced in said pick-up windings is a measure of said displacement.

5. In a device for measuring the displacement of a movable member, the combination including a first ferromagnetic member, means for inducing alternating flux in said first member, a second ferromagnetic member spaced from said first member by an air gap space, a ferromagnetic structure including third and fourth ferromagnetic members connecting said first member with said second member as positions on opposite sides of said space, a movably mounted non-magnetic flux-barrier having two closed loops with a common portion extending into said space between said first and second members, and said loops respectively surrounding said third and fourth members, and measuring means for determining the relative division of said alternating flux between said third and fourth members, whereby as said flux-barrier is displaced from a balance position, wherein the alternating flux is divided equally between said third and fourth members, the flux in said third member changes oppositely from the simultaneous change occurring in the flux in said fourth member.

References Cited in the file of this patent

UNITED STATES PATENTS

| Number | Name | Date |
|---|---|---|
| 1,582,524 | Latour | Apr. 27, 1926 |
| 2,207,248 | Garlick, Jr. | July 9, 1940 |